US011609976B2

(12) United States Patent
Jo et al.

(10) Patent No.: US 11,609,976 B2
(45) Date of Patent: Mar. 21, 2023

(54) METHOD AND SYSTEM FOR MANAGING IMAGE BASED ON INTERWORKING FACE IMAGE AND MESSENGER ACCOUNT

(71) Applicant: LINE Plus Corporation, Seongnam-si (KR)

(72) Inventors: Yuri Jo, Seongnam-si (KR); Hee Jin Park, Seongnam-si (KR)

(73) Assignee: LINE Plus Corporation, Seongnam-si (KR)

(*) Notice: Subject to any disclaimer, the term of this patent is extended or adjusted under 35 U.S.C. 154(b) by 140 days.

(21) Appl. No.: 16/677,187

(22) Filed: Nov. 7, 2019

(65) Prior Publication Data
US 2020/0201969 A1 Jun. 25, 2020

(30) Foreign Application Priority Data

Dec. 19, 2018 (KR) .................. 10-2018-0165210

(51) Int. Cl.
*G06F 21/00* (2013.01)
*G06F 21/32* (2013.01)
(Continued)

(52) U.S. Cl.
CPC ........... *G06F 21/32* (2013.01); *G06Q 10/107* (2013.01); *G06Q 30/02* (2013.01); *H04L 51/04* (2013.01);
(Continued)

(58) Field of Classification Search
CPC ...... G06F 21/32; G06Q 10/107; G06Q 30/02; H04L 51/04; H04L 51/14; H04L 67/306
(Continued)

(56) References Cited

U.S. PATENT DOCUMENTS 9,098,584 B1 * 8/2015 Fredinburg ............ G06F 16/951
10,334,307 B2 * 6/2019 Hogeg ................ H04N 21/4223
(Continued)

FOREIGN PATENT DOCUMENTS

KR 10-2014-0091599 A 7/2014
KR 10-1468192 B1 12/2014
(Continued)

OTHER PUBLICATIONS

Plaugic. "Snapchat's birthday present to you is a new filter". 2016. The Verge. pp. 1-3. (Year: 2016).*
(Continued)

*Primary Examiner* — Imad Hussain
(74) *Attorney, Agent, or Firm* — Sughrue Mion, PLLC

(57) ABSTRACT

Provided are a method and system for managing an image based on interaction between a face image and a message account. An image management method may include: storing, in a database, a plurality of face images and a plurality of messenger accounts in association with each other; receiving a target image; recognizing a face image from the received target image; searching, the database for a first face image that matches the recognized face image, among the stored plurality of face images, and identifying a first messenger account corresponding to the first face image, among the stored plurality of messenger accounts; and displaying information of the first messenger account in association with the first face image, in the target image.

17 Claims, 9 Drawing Sheets

(51) Int. Cl.
*H04L 51/04* (2022.01)
*G06Q 30/02* (2023.01)
*H04L 67/306* (2022.01)
*G06Q 10/107* (2023.01)
*H04L 51/214* (2022.01)

(52) U.S. Cl.
CPC .......... *H04L 51/214* (2022.05); *H04L 67/306* (2013.01)

(58) Field of Classification Search
USPC ........................................................ 713/186
See application file for complete search history.

(56) References Cited

U.S. PATENT DOCUMENTS

| | | | | |
|---|---|---|---|---|
| 10,748,006 | B1* | 8/2020 | Paul .................... | G06K 9/00288 |
| 2012/0026191 | A1* | 2/2012 | Aronsson ............. | G02B 27/017 |
| | | | | 345/633 |
| 2012/0230538 | A1* | 9/2012 | Calman ................. | G06Q 30/02 |
| | | | | 382/103 |
| 2013/0142387 | A1* | 6/2013 | Gomez ................. | G02B 27/017 |
| | | | | 382/103 |
| 2015/0227609 | A1* | 8/2015 | Shoemaker ........... | G06F 16/532 |
| | | | | 707/737 |
| 2015/0227782 | A1* | 8/2015 | Salvador ............. | G06F 16/5854 |
| | | | | 382/118 |
| 2019/0122045 | A1* | 4/2019 | Ravi .................... | G06K 9/00228 |
| 2020/0327153 | A1* | 10/2020 | Jang ........................ | G06Q 50/01 |
| 2021/0126806 | A1* | 4/2021 | Jang .................... | H04L 12/1818 |

FOREIGN PATENT DOCUMENTS

| | | |
|---|---|---|
| KR | 10-2016-0015703 A | 2/2016 |
| KR | 10-1633212 B1 | 6/2016 |
| KR | 10-2017-0006778 A | 1/2017 |
| KR | 10-2017-0138682 A | 12/2017 |

OTHER PUBLICATIONS

Facebook/Meta. "Messenger Announces Global Launch of a New Powerful Native Camera Justin Time for the Holidays". Dec. 15, 2016. pp. 1-8. (Year: 2016).*

* cited by examiner

METHOD AND SYSTEM FOR MANAGING IMAGE BASED ON INTERWORKING FACE IMAGE AND MESSENGER ACCOUNT

CROSS-REFERENCE TO RELATED APPLICATION(S)

This application claims priority from Korean Patent Application No. 10-2018-0165210, filed on Dec. 19, 2018 in the Korean Intellectual Property Office, the disclosure of which is incorporated herein by reference in its entirety.

BACKGROUND

1. Field

Apparatuses and methods consistent with example embodiments relate to image management based on an interaction between a face image and a messenger account, and more particularly, relate to an image management method in which a person in a target image is recognized based on an interaction between a face image and a messenger account, and a visual effect applicable to the target image is recommended to a user.

2. Description of Related Art

Technology for recognizing a face in an image may apply in various fields. For example, facial recognition may be used to unlock smartphones and to provide reliable information to users at a social media sites.

SUMMARY

One or more example embodiments provide an image management method that may identify a person in a target image using a face image interacting with a messenger account, and may recommend a visual effect to be applied to the target image based on the identified person or may process sharing using a messenger of the target image based on the identified person, a computer apparatus for performing the method, and a non-transitory computer-readable storage medium storing instructions that, when executed by a processor, cause the processor to perform the image management method.

According to an aspect of an example embodiment, there is provided an image management method of a server including at least one processor, the method including: storing, in a database, a plurality of face images and a plurality of messenger accounts in association with the plurality of face images; receiving a target image from a user terminal; recognizing a face image from the received target image; searching, the database for a first face image that matches the recognized face image, among the stored plurality of face images, and identifying a first messenger account corresponding to the first face image, among the stored plurality of messenger accounts; and displaying information of the first messenger account in association with the first face image, in the target image.

The first messenger account may be a messenger account of a user of the user terminal, or a messenger account of another user.

The image management method may further include: determining an event associated with the identified first messenger account; and displaying information of the event in the target image.

The determining the event may include: determining the event based on at least one of birthday information, anniversary information, schedule information, and messenger chat content acquired from the identified first messenger account.

The displaying the information of the event in the target image may include: displaying the information of the event by applying a visual effect to the target image.

The image management method may further include: identifying an existing first chatroom in which the first messenger account participates, among a plurality of existing chatrooms; and recommending the identified existing first chatroom as a chatroom for sharing the target image.

The recommending the identified existing chatroom may include: assigning a highest display priority to the identified existing first chatroom among the plurality of existing chatrooms.

The image management method may further include: creating a new chatroom in which the first messenger account participates; and recommending the identified existing first chatroom as a chatroom for sharing the target image.

According to an aspect of another example embodiment, there is provided an image management method of a user terminal including at least one processor, the method including: recognizing a face image included in a target image; determining a messenger account associated with the face image; and displaying information of the messenger account in association with the face image, in the target image.

The image management method may further include: providing a user interface that allows a user to change the messenger account associated with the face image, to another messenger account.

The determining the messenger account may include: transmitting the target image to a server that stores, in a database, a plurality of face images and a plurality of messenger accounts in association with the plurality of face images; and receiving, from the server, the information of the first message account in response to searching the database based the target image.

The image management method may further include: determining an event associated with the messenger account; and applying a visual effect to the target image based on the event.

The determining the event may include: determining the event based on at least one of birthday information, anniversary information, schedule information, and messenger chat content acquired from the messenger account that is determined as being associated with the face image.

The image management method may further include: identifying an existing chatroom in which the messenger account participates, or creating a new chatroom in which the messenger account participates.

The image management method may further include: providing a chatroom list through a messenger service; and providing a user interface configured to select a chatroom for sharing of the target image from the chatroom list, wherein a display priority is assigned to an existing chatroom in which the message account participate, among a plurality of chatrooms in the chatroom list.

The image management method may further include: providing a chatroom list through a messenger service; and providing a user interface that allows a user to create a new chatroom in which the messenger account participates, and to add the new chatroom to the chatroom list.

According to an aspect of another example embodiment, there is provided a non-transitory computer-readable storage medium storing a program that is executable by a computer to perform the image management method.

According to an aspect of another example embodiment, there is provided a computer apparatus including: a memory storing computer-readable instructions; and at least one processor configured to execute the computer-readable instruction to: store, in a database, a plurality of face images and a plurality of messenger accounts in association with each other; receive a target image from a user terminal; recognize a face image from the received target image; search the database for a first face image that matches the recognized face image, among the stored plurality of face images, and identify a first messenger account corresponding to the first face image, among the stored plurality of messenger accounts; and display information of the first messenger account in association with the first face image, in the target image.

The at least one processor may be further configured to execute the computer-readable instruction to: determine an event associated with the messenger account; and display information of the event in the target image in the target image.

The at least one processor may be further configured execute the computer-readable instruction to: identify an existing chatroom in which the messenger account participates, or create a new chatroom in which the messenger account participates.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
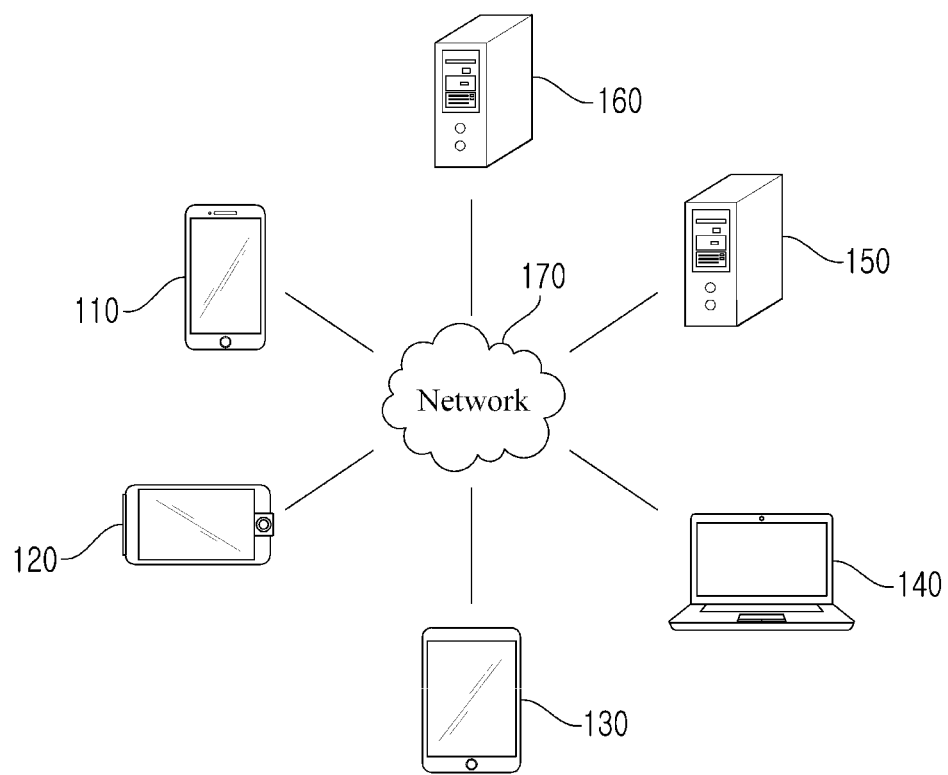
FIG. 1 illustrates an example of a network environment according to at least one example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

An image management method according to example embodiments may be implemented through a computer apparatus, which is described below. For example, a computer program according to example embodiments may be installed and executed on the computer apparatus. The computer apparatus may perform the image management method according to the example embodiments under control of the executed computer program. The computer program may be stored in a non-transitory computer-readable medium to perform the image management method on the computer apparatus in conjunction with the computer apparatus. Herein, the computer program may be in a form of a single independent program package or may be in a form in which a single independent program package is installed in the computer apparatus and linked with an OS or other program packages.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto. Also, the network environment of FIG. 1 is provided as an example among environments applicable to the example embodiments and is not construed of limiting an environment applicable to the example embodiments.

Each of the plurality of electronic devices 110, 120, 130, and 140 may be a stationary terminal or a mobile terminal configured as a computer apparatus. For example, the plurality of electronic devices 110, 120, 130, and 140 may be a smartphone, a mobile phone, a navigation, a computer, a laptop computer, a digital broadcasting terminal, a personal digital assistant (PDA), a portable multimedia player (PMP), and a tablet personal computer (PC). For example, although FIG. 1 illustrates a shape of a smartphone as an example of the electronic device 110, the electronic device 110 may refer to one of various physical computer apparatuses capable of communicating with other electronic devices 120, 130, and 140, and/or the servers 150 and 160 over the network 170 in a wired communication manner or in a wireless communication manner.

The communication scheme is not particularly limited and may include a communication method using a near field communication between devices as well as a communication method using a communication network, for example, a mobile communication network, the wired Internet, the wireless Internet, a broadcasting network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, it is only an example and the example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and 140 over the network 170. For example, the server 150 may be a system that provides a service, for example, a messenger service, a financial service, a payment service, a social networking service (SNS), a mail service, a content providing service, a voice recognition service, and a navigation service, to the plurality of electronic devices 110, 120, 130, and/or 140 over the network 170.

Figure 2:
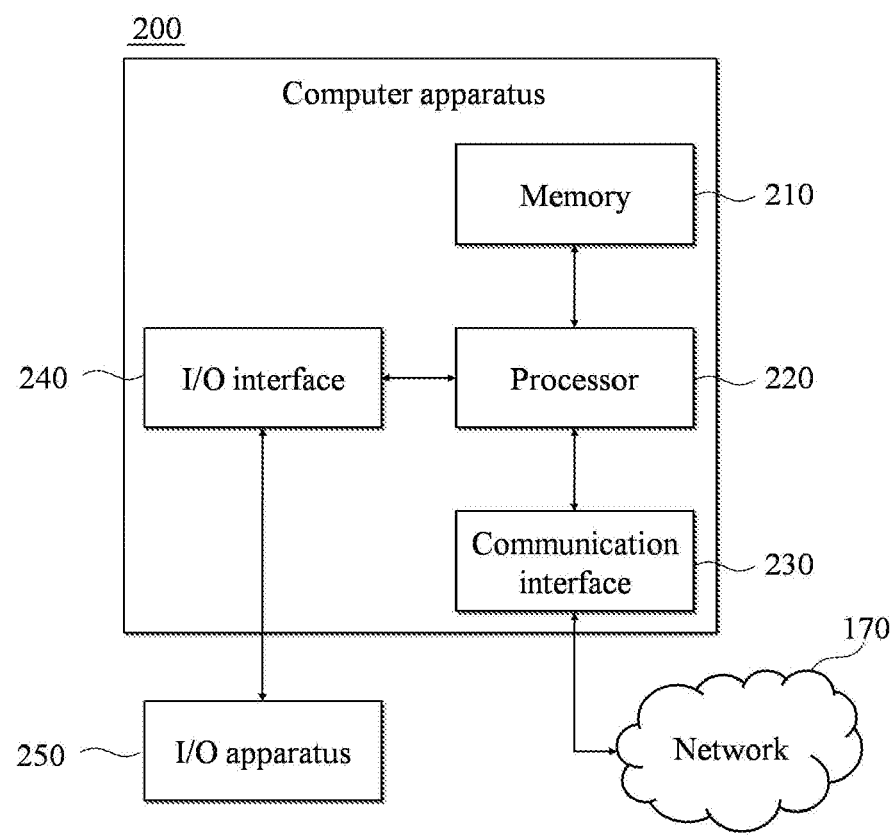
FIG. 2 illustrates an example of a computer apparatus according to at least one example embodiment.

FIG. 2 is a block diagram illustrating an example of a computer apparatus according to at least one example embodiment. Each of the plurality of electronic devices 110, 120, 130, and 140 or each of the servers 150 and 160 may be configured through a computer apparatus 200 of FIG. 2. An image management method according to at least one example embodiment may be performed by the computer apparatus 200.

Referring to FIG. 2, the computer apparatus 200 may include a memory 210, a processor 220, a communication interface 230, and an input/output (I/O) interface 240. The memory 210 may include a permanent mass storage device, such as random access memory (RAM) and read only memory (ROM), as a non-transitory computer-readable storage medium. Here, the permanent mass storage device, such as ROM and a disk drive, may be included in the computer apparatus 200 as a permanent storage device separate from the memory 210. Also, an OS or at least one program code may be stored in the memory 210. Such software components may be loaded to the memory 210 from another non-transitory computer-readable storage medium separate from the memory 210. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 210 through the communication interface 230, instead of, or in addition to, the non-transitory computer-readable storage medium. For example, software components may be loaded to the memory 210 of the computer apparatus 200 based on a computer program installed by files provided over the network 170.

The processor 210 may be configured to process computer-readable instructions of a computer program by performing basic arithmetic operations, logic operations, and I/O operations. The computer-readable instructions may be provided from the memory 210 or the communication interface 230 to the processor 220. For example, the processor 220 may be configured to execute received instructions in response to the program code stored in the storage device, such as the memory 210.

The communication interface 230 may provide a function for communication between the computer apparatus 200 and another apparatus, for example, the aforementioned storage devices, over the network 170. For example, the processor 220 may control the communication interface 230 to transfer a request or an instruction, data, a file, etc., created based on a program code stored in the storage device such as the memory 210, to other devices over the network 170. The communication interface 230 may receive a signal, an instruction, data, etc., from another apparatus via the network 170. For example, a signal, an instruction, data, etc., received through the communication interface 230 may be transferred to the processor 220 or the memory 210, and content, a file, etc., may be stored in a storage medium, for example, the aforementioned permanent storage device, further includable in the computer apparatus 200.

The I/O interface 240 may be a device used for interface with an I/O apparatus 250. For example, an input device may include a device, such as a keyboard and a mouse, and an output device may include a device, such as a display and a speaker. As another example, the I/O interface 240 may be a device for interface with an apparatus in which an input function and an output function are integrated into a single function, such as a touchscreen. The I/O apparatus 250 may be configured as a single apparatus with the computer apparatus 200.

According to other example embodiments, the computer apparatus 200 may include a greater or smaller number of components than a number of components shown in FIG. 2. However, there is no need to clearly illustrate many components according to the related art. For example, the computer apparatus 200 may include at least a portion of the I/O apparatus 250, or may further include other components, for example, a transceiver, a database (DB), and the like.

Figure 3:
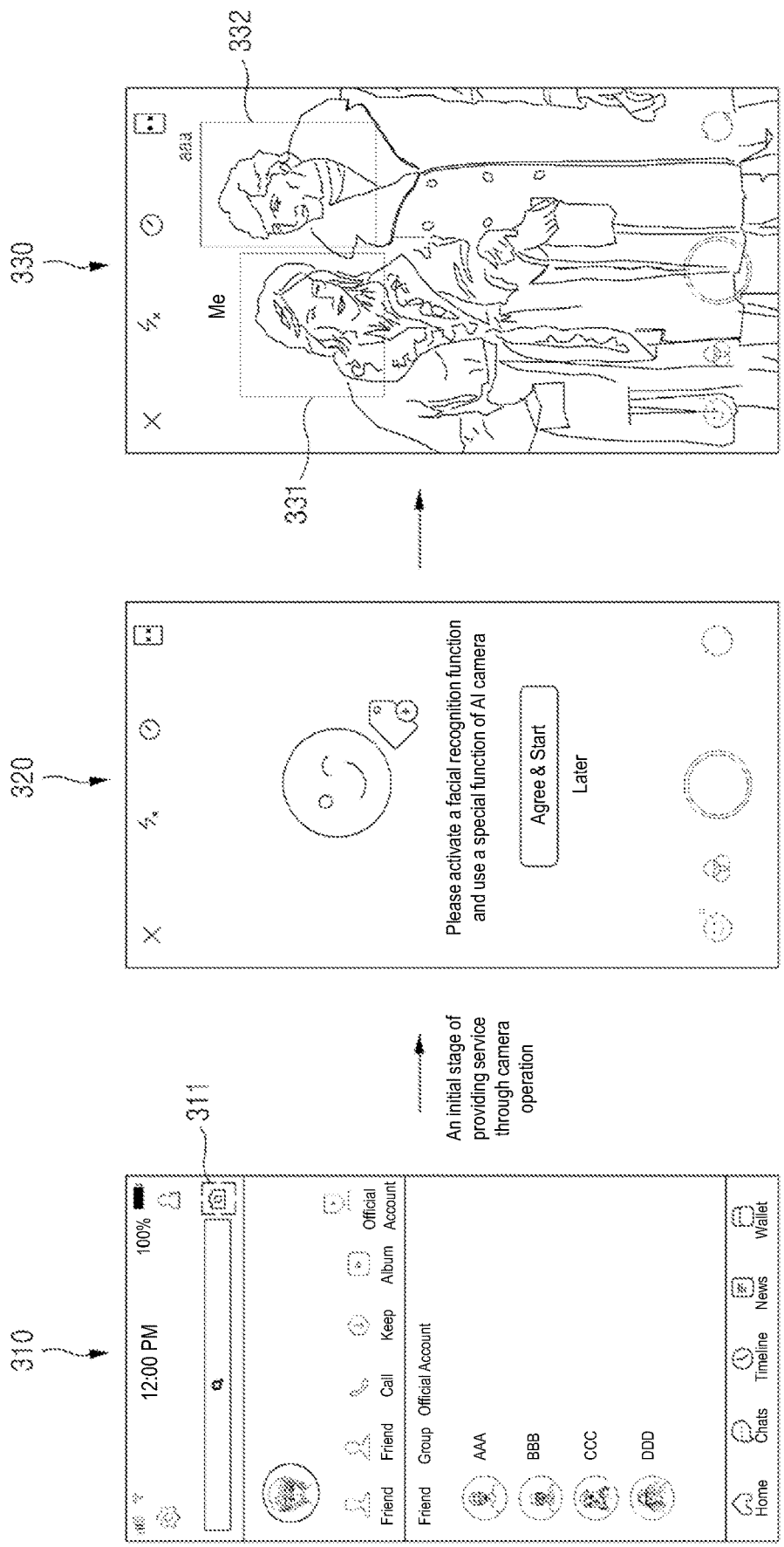
FIG. 3 illustrates an example of a service use agreement process according to at least one example embodiment.

FIG. 3 illustrates an example of a service use agreement process according to at least one example embodiment.

Referring to FIG. 3, a first screen 310 represents an example of a messenger service screen provided through a messenger application installed on a user terminal (e.g., a user terminal including a computer apparatus 200 illustrated in FIG. 2). The messenger service screen may include a user interface that enables a user of the user terminal to execute a camera included in the user terminal. When the user selects, clicks, or touches a camera icon in a first box 311, the user terminal may turn on the camera. For example, the processor 220 may execute a camera application to control the operation of the camera when the camera icon is selected, clicked, or touched by the user. The camera application may run on the message application, or may run separately from or simultaneously with the message application. Herein, referring to a second screen 320, a service use agreement process associated with the image management method may proceed at an initial stage of providing a service, for example, at a point in time at which the user initially executes the camera through the messenger application.

The second screen 320 represents an example of a screen for receiving an agreement to a service use from the user. Once the user agrees to the service use through the second screen 320, the processor 220 may perform the image management method on an image input through the executed camera, as illustrated on a third screen 330. The image may be an image captured by the camera, or a camera preview image which is shown to the user before the image is captured by the camera. The third screen 330 represents an example of recognizing a face image in an image and displaying a messenger account corresponding to the recognized face image, as illustrated in first and second rectangular boxes 331 and 332.

The processor 220 may analyze the image on the third screen 300, and may recognize, for example, two face images which are labeled as reference numbers 331 and 332 (hereinafter a first face image 331 and a second face image 332). The processor 220 may determine that the first face image 331 is associated with a messenger account "Me", and the second face image 332 is associated with a messenger account "aaa". To display a messenger account in association with a recognized face image, the processor 210 may perform an interaction between the face images 331 and 332 and messenger accounts which are stored in the user terminal or a server that communicates with the user terminal, and may identify that the messenger account "Me" and the message account "aaa" are associated with the first face image 331 and the second face image 332, respectively.

For example, the user terminal or the server may store a face image A in association with the messenger account "Me," so that the processor 200 may recognize that the face image A is an image of an account user of the messenger account "Me." When the first face image 331 is recognized from the third screen 300, the user terminal and/or the server may compare the face image A and the first face image 331 and may determine whether the face image A and the first face image 331 are face images of the same user. Here, when the face image A and the first face image 331 are determined as face images of the same user, the user terminal and/or the server may indicate the messenger account "Me" in association with the first face image 331. As shown on the third screen 330, the first face image 331 may be labeled as the messenger account "Me." Additionally, the user terminal or the server may store a face image B in association with the messenger account "aaa", so that the processor 200 may recognize that the face image B is an image of an account user of the messenger account "aaa." When the second face image 332 is recognized from the third screen 300, the user terminal and/or the server may compare the face image B and the second face image 332 and may determine whether the face image B and the second face image 332 are face images of the same user. Here, when the face image B and the second face image 332 are determined as face images of the same user, the user terminal and/or the server may indicate the messenger account "aaa" in association with the second face image 332. As shown on the third screen 330, the second face image 332 may be labeled as the messenger account "aaa." Various methods may be used for initial interaction between the face image and the messenger account.

Figure 4:
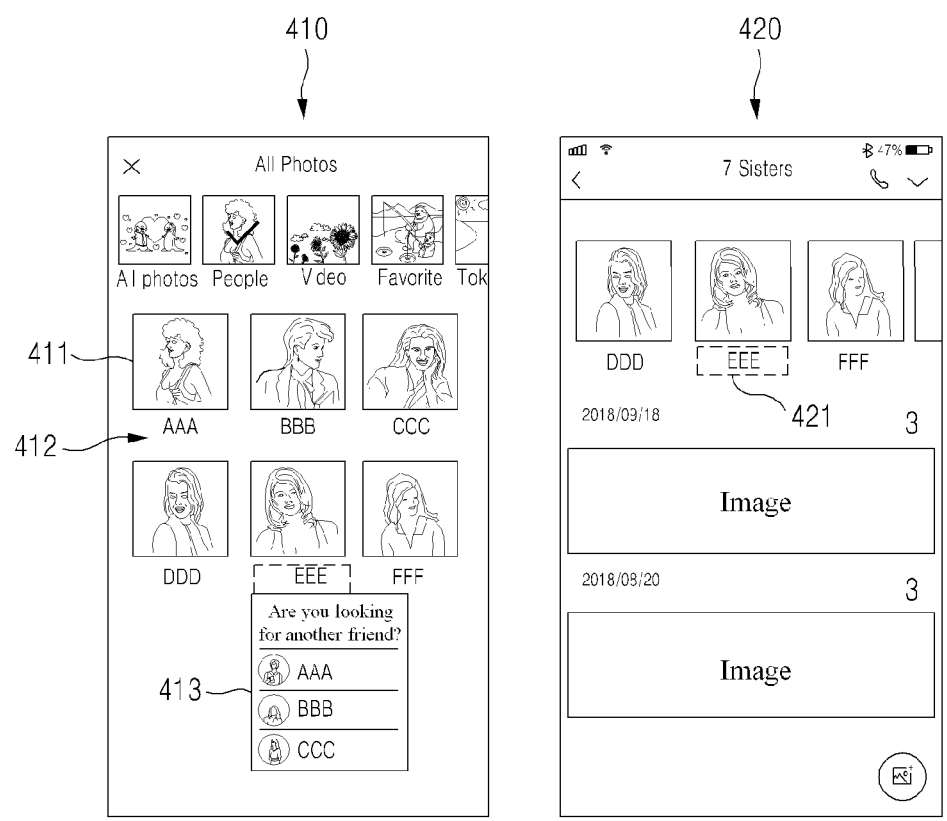
FIG. 4 illustrates an example of providing a messenger account interacting with a face image according to at least one example embodiment.

FIG. 4 illustrates an example of providing a messenger account interacting with a face image according to at least one example embodiment.

Referring to FIG. 4, a first screen 410 represents an example of interaction between a face image and a messenger account using images managed through a gallery application of a user terminal. For example, on the first screen 410, a first messenger account "AAA" 412 interacts with a first face image 411. Also, a second screen 420 represents an example of interaction between a face image and a messenger account using images registered to a messenger service in association with a messenger account of a user or a service associated with the messenger service. Here, the images managed through the gallery application may be images stored in a local storage of the user terminal, and the images registered to the messenger service or the service associated with the messenger service may be images stored in a storage of the server that provides the service.

A messenger application installed on the user terminal may provide a user interface that allows a messenger account to interact with a specific face image through interaction with the gallery application or interaction with the service provided from the server. For example, in response to a selection of the user on a specific face image from among face images displayed on the first screen 410 or the second screen 420, a messenger account of a friend selected by the user from a friend list may interact with the selected specific face image. Alternatively, a user interface that enables the user to directly input a messenger account may be provided.

In the meantime, a user interface for changing a messenger account that has already interacted with the specific face image may be provided. The first screen 410 represents an example of a user interface 413 configured to change the messenger account interacting with the specific face image, to another messenger account. Also, the second screen 420 represents an example of a user interface 421 that enables the user to directly correct and input the messenger account.

In embodiments of the present disclosure, a user terminal displaying the first screen 410 may store one or more images of a user AAA, in association with the user AAA's messenger account, may store one or more images of a user BBB, in association with the user BBB's messenger account, and may store one or more images of a user CCC, in association with the user CCC's messenger account. The location where the images of the users AAA, BBB, and CCC are not limited to a local storage of the user terminal, and the images may be stored in a server that is connected to the user terminal. The processor 220 may recognize that the first face image 411 is an image of the user AAA based on comparison between the first face image 411 and the images of the user AAA, the user BBB, and the user CCC, and may control the first screen 410 to display the user AAA's messenger account in connection with the first face image 411. The processor 220 may control the user interface 413 to allow the user to change a messenger account (e.g., a user EEE's messenger account) that associated with a certain image to another messenger account (e.g., the user AAA's messenger account) by providing a list of user messenger accounts.

In embodiments of the present disclosure, face images may be connected to or associated with various other user information, such as a user's identification, user name, phone number, e-mail address, and/or profile, in additional to or alternative to the user's messenger account.

In the embodiments described above, the memory 210 and the processor 220 may be elements included a user terminal or a server.

Figure 5:
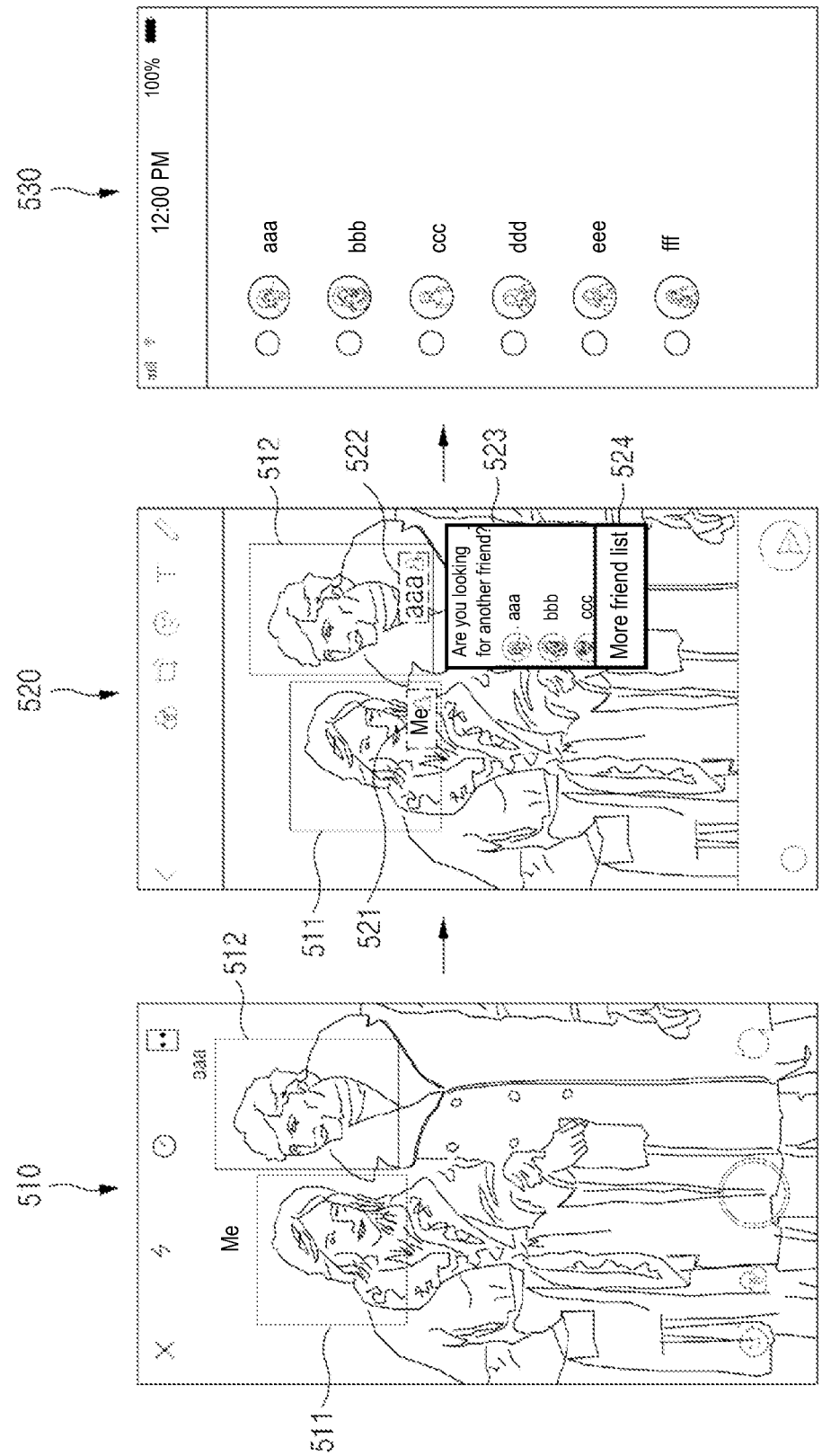
FIG. 5 illustrates another example of providing a messenger account interacting with a face image according to at least one example embodiment.

FIG. 5 illustrates another example of providing a messenger account interacting with a face image according to at least one example embodiment.

Referring to FIG. 5, a first screen 510 represents an example in which a camera is executed through a messenger application and an image input through the executed camera is displayed on a display of a user terminal. Here, the first screen 510 may be a screen displayed on the user terminal through a camera application that interacts with the messenger application. In example embodiments, an image of the first screen 510 may be a preview image that is provided to a user before an image is captured. Referring to the first screen 510, the messenger application may recognize a face image in an image. The face image may be recognized and extracted from a face of each person included in the image. In example embodiments, a process of extracting a face image in an image may be performed on the user terminal under control of the messenger application, or may be performed on a server providing a messenger service through communication between the user terminal and the server under control of the messenger application. For example, the user terminal may transmit an image input through the camera to the server through the messenger application and the server may recognize a face image in the transmitted image and may transmit the recognized face image to the user terminal. Here, a messenger account may be provided using the recognized face image. For example, the server may store face images and messenger accounts through interaction therebetween. Here, once the recognized face image is received from the user terminal, the server may compare the received face image to the stored face images and may acquire a messenger account corresponding to the received face image. For example, on the first screen 510, a face image 511 corresponding to a user identified by a messenger account "Me" of the user terminal and a face image 512 corresponding to a messenger account "aaa" are recognized.

Meanwhile, a second screen 520 represents an example in which a captured image is displayed in response to receiving a captured input from the user. Here, the user terminal may provide a user interface for managing messenger accounts respectively interacting with face images recognized in the captured image. For example, on the second screen 520, a first box 521 indicated with dotted lines represents a first user interface for managing the messenger account "Me" and a second box 522 indicated with dotted lines represents a second user interface for managing the messenger account "aaa". Such user interfaces displayed on the first box 521 and the second box 522 may represent face images recognized in the image, respectively. The user interfaces may further provide a user interface for receiving a selection on a messenger account for interaction from the user if there is no messenger account that interacts with a corresponding face image. For example, it is possible to provide a messenger friend list to the user and to interact a messenger account of a friend selected from the messenger friend list with a corresponding face image.

Meanwhile, on the second screen 520, a user interface 523 capable of changing an already interacting messenger account with another messenger account is displayed. The user terminal may provide messenger accounts interacting with a face image most similar to the recognized face image through the user interface 523. For example, on the second screen 520, three messenger accounts are displayed in similarity order through the user interface 523. In response to the user selecting one of the three messenger accounts displayed through the user interface 523, a messenger account for a face image corresponding to the second box 522 may be changed from "aaa" to the selected messenger account.

Also, the user interface 523 may further provide a function, such as "more friend list" 524, such that the user may directly select a friend from an entire messenger friend list. In response to a selection on the function "more friend list" 524, a friend list of the user may be provided as shown on a third screen 530. In response to selecting a single friend from the friend list, the messenger account for the face image corresponding to the second box 522 may be changed from "aaa" to a messenger account of the selected friend.

Figure 6:
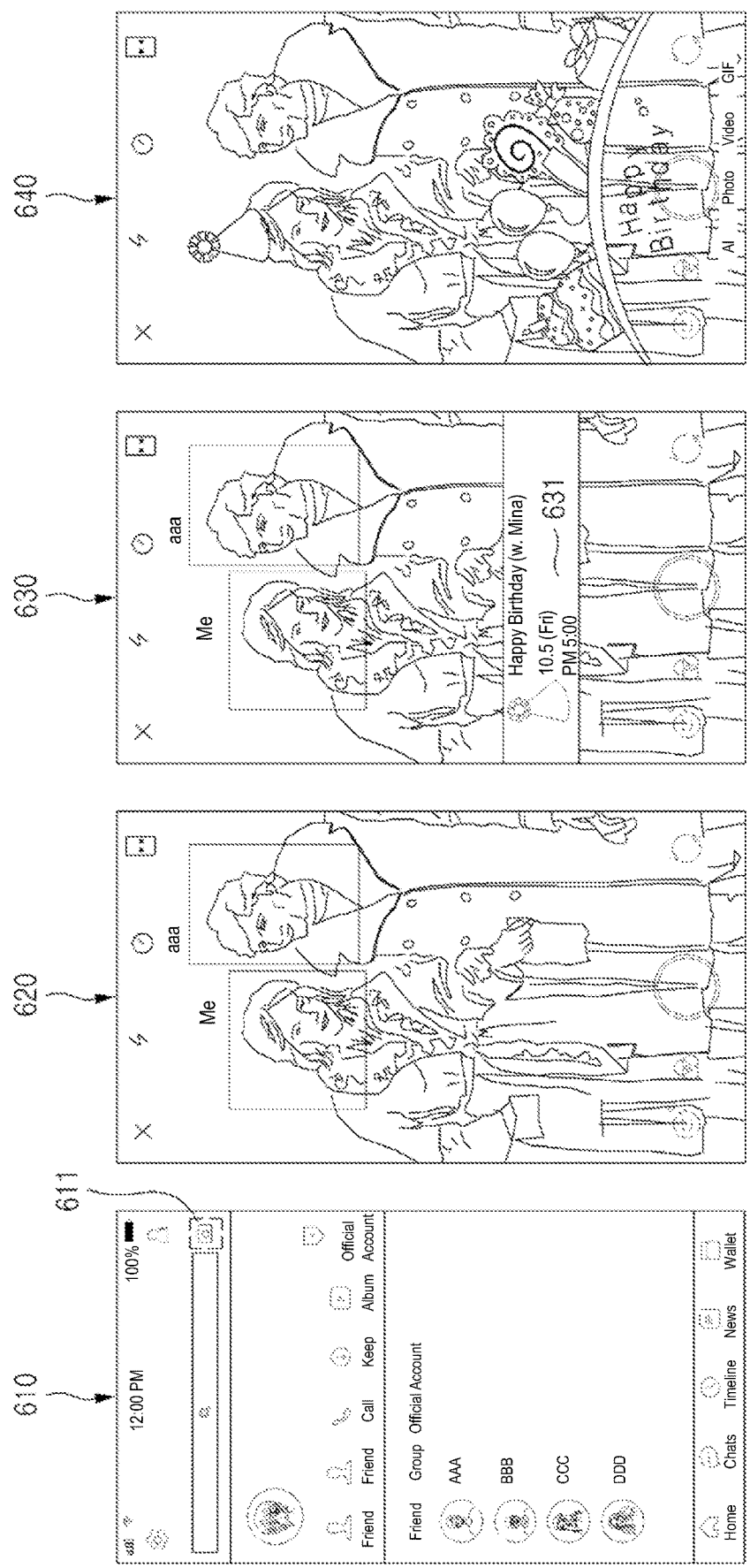
FIG. 6 illustrates an example of identifying a person in a target image using a face image interacting with a messenger and recommending an effect to be applied to the target image account based on the identified person according to at least one example embodiment.

FIG. 6 illustrates an example of identifying a person in a target image using a face image interacting with a messenger account and recommending an effect to be applied to the target image account based on the identified person according to at least one example embodiment.

Referring to FIG. 6, a first screen 610 represents an example of a messenger service screen provided through a messenger application installed on a user terminal, which is similar to the first screen 310 of FIG. 3. The messenger service screen may include a user interface that allows a user of the user terminal to turn on a camera of the user terminal, using a camera icon located in a first box 611. Once a service use agreement process is completed, a camera function may be executed as shown on a second screen 620.

The second screen 620 represents an example of recognizing face images in an image input through the camera and displaying messenger accounts for the recognized face images. Here, the user terminal may verify an event associated with the displayed messenger account directly through the messenger application or by communication with the server through the messenger application. For example, in response to a request from the user terminal, the server may determine an event based on a profile, activity information, account settings, and messenger chat content of the user corresponding to the messenger account at the messenger service and/or the service associated with the messenger service. For example, referring to the second screen 620, the event may be determined based on a birthday, schedule or anniversary information at the messenger service or a calendar service associated with the messenger service, messenger chat content, and the like, which are acquired with respect to a user of each of recognized two messenger accounts.

In detail, a third screen 630 represents an example of providing schedule information 631 associated with a birthday when a captured date of an image is a birthday of the user of the user terminal. For example, the processor 220 may check account settings of the messenger accounts "Me" and "aaa" and may determine whether the messenger accounts "Me" and "aaa" are set to receive emails or notifications about birthday reminders. The processor 220 may control the third screen 630 to display the schedule information 631 according to the account settings. As another example, the user terminal and/or the server may determine the event by analyzing chat content of a chatroom corresponding to messenger accounts of face images included in the target image. Here, a fourth screen 640 represents an example of selecting an effect associated with a birthday from among various visual effects (e.g., effects provided from a camera application and/or the messenger application) applicable to an image and applying the selected effect to the target image in response to a selection on the schedule information 631 provided from the third screen 630 (e.g., in response to a selection on the schedule information 631 by an occurrence of a touch input on an area on which the schedule information 631 is displayed in a touch screen environment or by a preset touch gesture or a voice input. Here, an effect may be controlled to occur based on a face image associated with the event if a plurality of face images is included in the target image. For example, on the fourth screen 640, a hat effect is applied to a face image of a user having a birthday. However, if the user having the birthday is a user of the messenger account "aaa", the hat effect may apply to a face image of the user of the messenger account "aaa".

Figure 7:
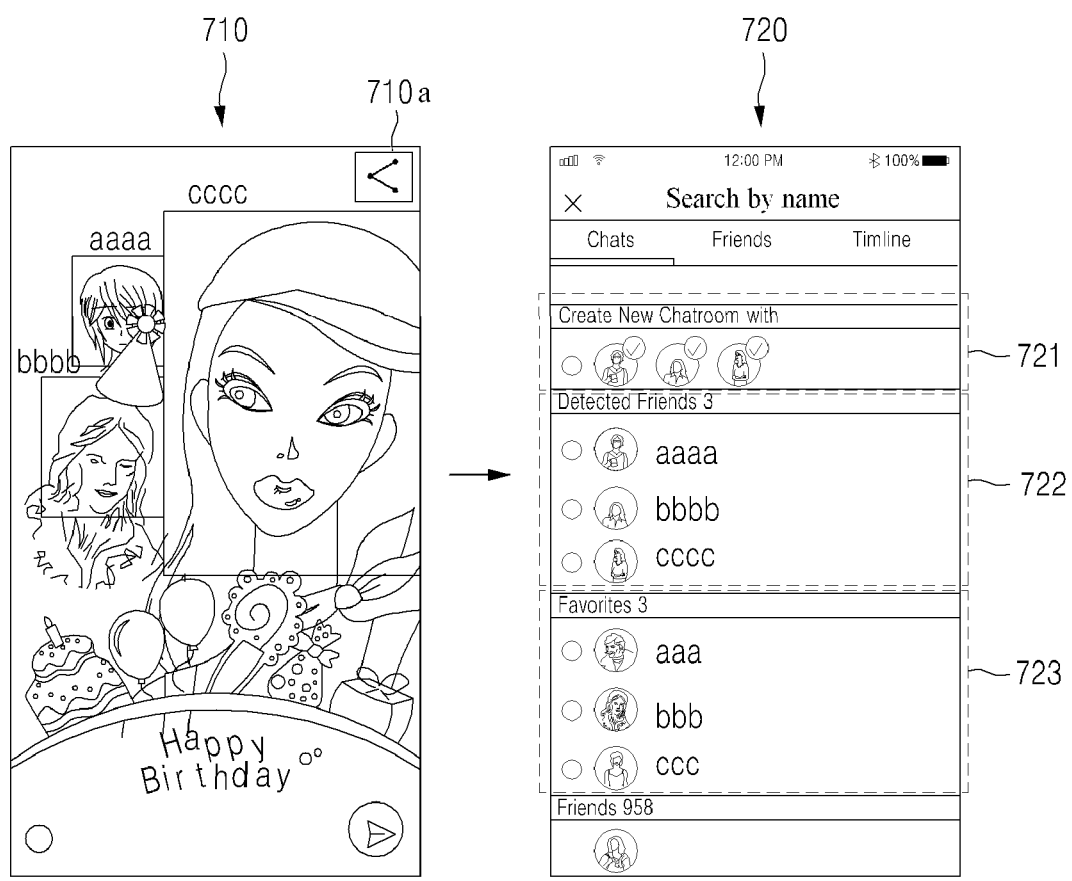
FIG. 7 illustrates an example of identifying a person in a target image using a face image interacting with a messenger account and processing an effect to be applied to the target image based on the identified person according to at least one example embodiment.

FIG. 7 illustrates an example of identifying a person in a target image using a face image interacting with a messenger account and processing an effect to be applied to the target image based on the identified person according to at least one example embodiment.

Referring to FIG. 7, a first screen 710 represents an example of recognizing three face images in a target image and displaying a messenger account corresponding to each of the recognized three face images. The processor 220 may recognize the three face images as images of a user aaa, a user bbb, and a user ccc, and control the first screen 710 to label the images, as "aaa," "bbb," and "ccc," respectively. When a user of a user terminal desires to share the target image through a messenger service, the processor 200 may provide a user interface that allows the user to select a friend or a chatroom for sharing of the target image may be provided as shown on a second screen 720. The processor 200 may control the first screen 710 to display a share icon 710a and may switch the first screen 710 to the second screen 720 when the share icon is selected, clicked, or touched by the user. Here, the user terminal and/or server may recommend a chatroom in which at least one of the users of the three messenger accounts participate. If there is no existing chatroom, a function for automatically creating a chatroom in which messenger accounts participate may be provided. For example, on the second screen 720, a first box 721 indicated with dotted lines represents a function for automatically creating a group chatroom in which three messenger accounts participate and a second box 722 indicated with dotted lines represents a function for recommending existing chatrooms in which a portion of the three messenger accounts participate. Also, a third box 723 indicated with dotted lines represents a function for preferred chatrooms when the user desires to share an image or a file.

Figure 8:
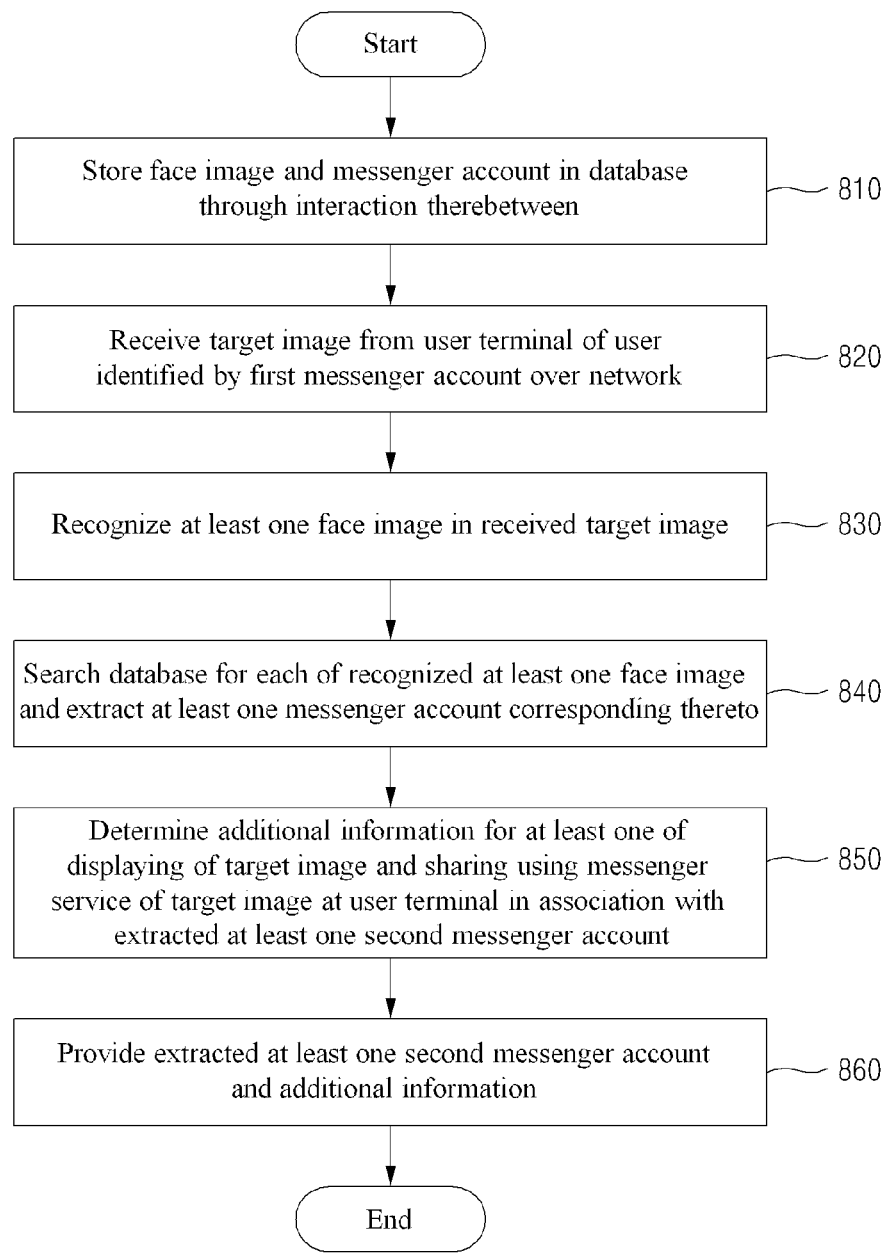
FIG. 8 is a flowchart illustrating an example of an image management method of a server according to at least one example embodiment.

FIG. 8 is a flowchart illustrating an example of an image management method of a server according to at least one example embodiment. The image management method of FIG. 8 may be performed by the aforementioned computer apparatus 200 that configures the server. For example, the processor 220 of the computer apparatus 200 may be configured to execute an instruction according to a code of at least one program or a code of an OS included in the memory 210. As shown in FIG. 8, the processor 220 may control the computer apparatus 200 to perform operations 810 to 860 of the image management method in response to a control instruction provided from the code stored in the computer apparatus 200.

Referring to FIG. 8, in operation 810, the computer apparatus 200 may store a face image and a messenger account in a database through interaction therebetween. For example, the server configured by the computer apparatus 200 may provide a messenger service to users and may store, in the database, a messenger account selected by each of the users for a face image to interact with the corresponding face image. As described above, the messenger account may be selected from a messenger friend list of each of the users. Depending on example embodiments, the users may also directly input a messenger account corresponding to a face image. Here, the users may correspond to user terminals substantially used by the users to utilize a messenger service. A messenger application for receiving the messenger service may be installed on each of the user terminals.

In operation 820, the computer apparatus 200 may receive a target image from a user terminal of a user identified by a first messenger account over a network. The target image may include an image input through a camera included in the user terminal and/or an image selected by the user from among images stored in a local storage of the user terminal. For example, the messenger application may interact with a camera application and may control the user terminal to transmit an image input through the camera application to the server as a target image. As another example, the messenger application may interact with a gallery application and may control the user terminal to transmit an image selected by the user from a gallery to the server as a target image.

In operation 830, the computer apparatus 200 may recognize at least one face image in the received target image. Technology for recognizing a face of a person in an image may be implemented using at least one of various techniques known in the art. A face image may not be included in the target image. Alternatively, at least one face image may be included in the target image.

In operation 840, the computer apparatus 200 may search the database for each of the recognized at least one face image and may identify at least one second messenger account corresponding thereto. As described above, the computer apparatus 200 may search the database for a face image A, and when the face image A and a face image B stored in the database are determined to include a face of the same person, the computer apparatus 200 may identify a second messenger account stored through interaction with the face image B. The second messenger account may be identified for each of face images included in the target image. When the computer apparatus 200 cannot identify any corresponding messenger account with respect to the recognized face image, the computer apparatus 200 may request the user terminal to select or input a messenger account corresponding to the recognized face image. When the specific messenger account is selected or input for the face image recognized from the user terminal, the computer apparatus 200 may store the selected or input specific messenger account through interaction with the recognized face image.

In operation 850, the computer apparatus 200 may determine additional information for at least one of displaying of the target image and sharing using a messenger service of the target image at the user terminal in association with the identified at least one second messenger account.

In one example embodiment, the computer apparatus 200 may determine an event associated with the identified at least one second messenger account or an effect to be applied to the target image in response to the event as additional information. Here, the event may be determined based on at least one of birthday information, anniversary information, schedule information, and messenger chat content acquired by at least one of the identified at least one second messenger account, and relationship information between users that is analyzed based on a messenger service use pattern. For example, the computer apparatus 200 may determine the event by extracting a birthday, an anniversary, and a schedule of a user of a second messenger account based on a current date. As another example, the computer apparatus 200 may also determine the event based on messenger chat content of a chatroom in which the second messenger account participates. As another example, the computer apparatus 200 may determine the event based on information about a user B to which a user A transmits a message most frequently based on priorities of users according to a number of messages transmitted by the user A to each user, or may determine the event based on information about participants of a chatroom to or from which the user A transmits or receives a message most frequently. As another example, the computer apparatus 200 may verify in advance a relationship between users and a relationship between user accounts, such as "family, lovers, best friend", through a use pattern of the messenger service, and may determine the event based on the verified relationship between users.

In another example embodiment, the computer apparatus 200 may determine, as additional information, at least one of information about an existing first chatroom in which the identified at least one second messenger account participates and information about creation of a new second chatroom in which the identified at least one second messenger account participates. For example, when the user terminal desires to share the target image through the messenger service, a chatroom list may be displayed and the user may select a chatroom for sharing the target image from the displayed chatroom list. Here, the user terminal may assign a display priority to the first chatroom such that the first chatroom may be displayed at a top end of the chatroom list as the additional information. Also, the user terminal may provide a function for creating a new second chatroom in which the second messenger account participates through the chatroom list based on the additional information. In this case, the target image may be shared through a newly created second chatroom. That is, the target image may be shared through a chatroom in which a person or persons included in the target image participate.

In operation 860, the computer apparatus 200 may provide the identified at least one second messenger account and the additional information. For example, the computer apparatus 200 may transmit the identified at least one second messenger account and the additional information to the user terminal over the network. As described above, the user terminal may use the additional information for displaying or sharing of the target image.

In the example embodiment, although an example in which the server processes recognition of a face image, identification of an associated messenger account, determination of additional information is described, at least one of recognition of a face image, identification of an associated messenger account, and determination of additional information may be processed at the user terminal depending on example embodiments. Even in this case, information for processing each of the processes may be provided from the server.

Figure 9:
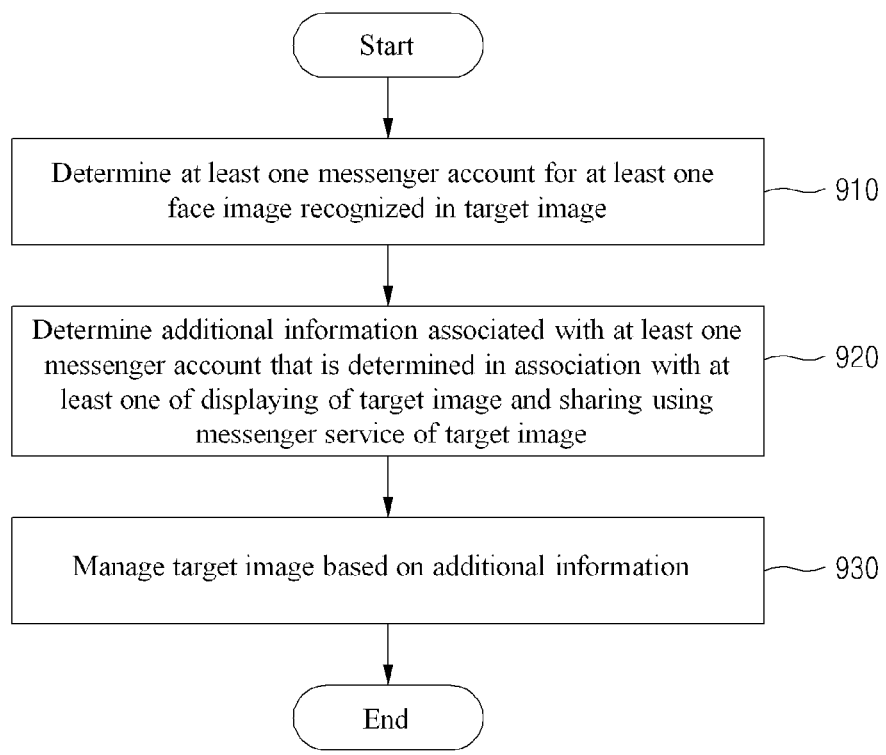
FIG. 9 is a flowchart illustrating an example of an image management method of a user terminal according to at least one example embodiment.

FIG. 9 is a flowchart illustrating an example of an image management method of a user terminal according to at least one example embodiment. The image management method of FIG. 9 may be performed by the computer apparatus 200 that configures the aforementioned user terminal. For example, the processor 220 of the computer apparatus 200 may be configured to execute a control instruction according to a code of at least one program or a code of an OS included in the memory 210. Here, the processor 220 may control the computer apparatus 200 to perform operations 910 to 930 included in the image management method of FIG. 9 in response to a control instruction provided from the code stored in the computer apparatus 200.

Referring to FIG. 9, in operation 910, the computer apparatus 200 may determine at least one messenger account for at least one face image recognized in a target image. For example, the computer apparatus 200 may determine a messenger account for a face image by transmitting the target image to a server that stores the face image and the messenger account in a database through interaction therebetween, and by receiving, from the server, at least one messenger account that is identified by searching the database for each of at least one face image recognized in the target image over a network. Depending on example embodiments, a messenger account interacting with a face image of each of messenger friends of the user may be stored in the user terminal. In this case, the messenger account for the face image recognized in the target image may be directly determined at the user terminal.

In operation 920, the computer apparatus 200 may determine additional information associated with at least one messenger account that is determined in association with at least one of displaying of the target image and sharing using a messenger service of the target image.

In operation 930, the computer apparatus 200 may manage the target image based on the additional information.

For example, in operation 920, the computer apparatus 200 may determine, as the additional information, an event associated with the determined at least one messenger account or an effect to be applied to the target image in response to the event. Here, the event may be determined based on at least one of birthday information, anniversary information, schedule information, and messenger chat content acquired by at least one of the determined at least one messenger account, and relationship information between users that is analyzed based on a messenger service use pattern. Here, the computer apparatus 200 may apply the effect determined as the additional information in operation 930 to the target image.

As another example, in operation 920, the computer apparatus 200 may determine, as the additional information, at least one of information about an existing first chatroom in which the determined at least one second messenger account participates and information about creation of a new second chatroom in which the determined at least one second messenger account participates. For example, in operation 930, the computer apparatus 200 may provide a chatroom list of the messenger service and may provide a function of selecting a chatroom for sharing of the target image from the chatroom list. Here, display priority may be assigned to the first chatroom in the chatroom list. For example, a chatroom in which persons included in the target image may be displayed at an upper end of the chatroom list. Also, the computer apparatus 200 may provide a function for creating a new second chatroom in which the determined at least one messenger account participates through the chatroom list in operation 930.

Depending on example embodiments, the computer apparatus 200 may provide a user interface for displaying a target image including a messenger account for each of recognized at least one face image and changing a messenger account included in the target image. The user interface for changing a messenger account is described with reference to FIG. 5.

According to example embodiments, it is possible to identify a person in a target image using a face image interacting with a messenger account, and to recommend an effect to be applied to the target image based on the identified person or process sharing using a messenger of the target image based on the identified person.

The systems and/or apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image management method of a server comprising at least one processor, the image management method comprising:

storing, in a database, a plurality of face images and a plurality of messenger accounts in association with the plurality of face images;

receiving a target image from a user terminal;

recognizing a face image from the received target image;

searching the database for a first face image that matches the recognized face image, among the stored plurality of face images, and identifying a first messenger account corresponding to the first face image, among the stored plurality of messenger accounts;

while displaying the first messenger account as corresponding to the first face image, providing a second messenger account as a candidate account corresponding to the face image, and enabling the user terminal to change an identifier of the face image from the first messenger account to the second messenger account; and determining a scheduled current or future event associated with the first messenger account, based on a profile of the first messenger account; and enabling the user terminal to display, over the target image, a graphic object or text associated with the scheduled current or future event, wherein the target image is a preview image of a target that is captured within a messenger application.

2. The image management method of claim 1, further comprising:

providing a user interface that enables the user terminal to correct the first messenger account that is identified as corresponding to the first face image, to a second user account that is different from the first messenger account.

3. The image management method of claim 1, wherein the determining the scheduled current or future event comprises:

determining the scheduled current or future event further based on anniversary information acquired from the first messenger account.

4. The image management method of claim 1, wherein the enabling the user terminal to display the graphic object or the text associated with the scheduled current or future event comprises:

providing information of a visual effect associated with the scheduled current or future event, to be applied to the target image.

5. The image management method of claim 1, further comprising:

identifying an existing first chatroom in which the first messenger account participates, among a plurality of existing chatrooms; and recommending the identified existing first chatroom as a chatroom for sharing the target image.

6. The image management method of claim 5, wherein the recommending the identified existing first chatroom comprises:

assigning a highest display priority to the identified existing first chatroom among the plurality of existing chatrooms.

7. The image management method of claim 1, further comprising:

when there is no existing chatroom in which the first messenger account participates, creating a new chatroom to share the target image with the first messenger account.

8. An image management method of a user terminal comprising at least one processor, the image management method comprising:

recognizing a face image included in a target image;

determining a messenger account associated with the face image;

while displaying a first messenger account as corresponding to the face image, providing a second messenger account as a candidate account corresponding to the face image, enabling the user terminal to change an identifier of the face image from the first messenger account to the second messenger account; and determining a scheduled current or future event associated with the messenger account, based on a profile of the messenger account; and enabling the user terminal to display, over the target image, a graphic object or text associated with the scheduled current or future event, wherein the target image is a preview image of a target that is captured within a messenger application.

9. The image management method of claim 8, wherein the determining the messenger account comprises:

transmitting the target image to a server that stores, in a database, a plurality of face images and a plurality of messenger accounts in association with the plurality of face images; and receiving, from the server, information of the messenger account in response to searching the database based on the target image.

10. The image management method of claim 8, further comprising:

applying a visual effect to the target image based on the scheduled current or future event.

11. The image management method of claim 10, wherein the determining the scheduled current or future event comprises:

determining the scheduled current or future event based on birthday information included in the profile of the messenger account.

12. The image management method of claim 8, further comprising:

identifying an existing chatroom in which the messenger account participates, or creating a new chatroom in which the messenger account participates.

13. The image management method of claim 8, further comprising:

providing a chatroom list through a messenger service; and providing a user interface that allows a user to select a chatroom for sharing of the target image from the chatroom list, wherein a display priority is assigned to an existing chatroom in which the messenger account participate, among a plurality of chatrooms in the chatroom list.

14. The image management method of claim 8, further comprising:

providing a chatroom list through a messenger service; and providing a user interface configured to create a new chatroom in which the messenger account participates, and to add the new chatroom to the chatroom list.

15. A non-transitory computer-readable storage medium storing a program that is executable by a computer to perform the image management method of claim 1.

16. A computer apparatus comprising:

a memory storing computer-readable instructions; and at least one processor configured to execute the computer-readable instructions to:

store, in a database, a plurality of face images and a plurality of messenger accounts in association with each other;

receive a target image from a user terminal;

recognize a face image from the received target image;

search the database for a first face image that matches the recognized face image, among the stored plurality of face images, and identify a first messenger account corresponding to the first face image, among the stored plurality of messenger accounts;

while displaying the first messenger account as corresponding to the face image, provide a second messenger account as a candidate account corresponding to the face image, and enable the user terminal to change an identifier of the face image from the first messenger account to the second messenger account; and determine an scheduled current or future event associated with the first messenger account, based on a profile of the first messenger account, and enable the user terminal to display, over the target image, a graphic object or text associated with the scheduled current or future event, wherein the target image is a preview image of a target that is captured within a messenger application.

17. The computer apparatus of claim 16, wherein the at least one processor is further configured execute the computer-readable instructions to:
identify an existing chatroom in which the messenger account participates, or create a new chatroom in which the first messenger account participates.

\* \* \* \* \*